US006587439B1

(12) United States Patent
Arcieri et al.

(10) Patent No.: US 6,587,439 B1
(45) Date of Patent: Jul. 1, 2003

(54) APPARATUS AND METHOD FOR MONITORING AND INTERPRETATION OF APPLICATION PROTOCOLS FOR NETWORK DATA TRANSMISSION SYSTEMS

(75) Inventors: Franco Arcieri, Rome (IT); Guido Maria Marinelli, Rome (IT); Maurizio Talamo, Rome (IT)

(73) Assignee: Alasi di Arcieri Franco & C. s.a.s., Rome (IT)

( * ) Notice: Subject to any disclaimer, the term of this patent is extended or adjusted under 35 U.S.C. 154(b) by 0 days.

(21) Appl. No.: 09/367,505

(22) PCT Filed: Feb. 16, 1998

(86) PCT No.: PCT/EP98/00874

§ 371 (c)(1),
(2), (4) Date: Aug. 17, 1999

(87) PCT Pub. No.: WO98/36532

PCT Pub. Date: Aug. 20, 1998

(30) Foreign Application Priority Data

Feb. 17, 1997 (IT) ........................................ RM97A0086

(51) Int. Cl.[7] .............................................. H04L 12/26
(52) U.S. Cl. ......................... 370/252; 370/469; 714/39
(58) Field of Search ................................. 370/469, 252, 370/465, 464, 351, 400, 401; 709/200, 224, 230, 250; 714/37, 39, 47

(56) References Cited

U.S. PATENT DOCUMENTS

| 5,101,402 A | | 3/1992 | Chiu et al. | |
|---|---|---|---|---|
| 5,793,954 A | * | 8/1998 | Baker et al. | 709/250 |
| 5,850,388 A | * | 12/1998 | Anderson et al. | 370/252 |
| 5,933,639 A | * | 8/1999 | Meier et al. | 709/310 |
| 6,115,393 A | * | 9/2000 | Engel et al. | 370/469 |
| 6,453,345 B2 | * | 9/2002 | Trcka et al. | 709/223 |

FOREIGN PATENT DOCUMENTS

EP 0 726 664 8/1996

OTHER PUBLICATIONS

Singh, Munindar. "On the Semantics of Protocols Among Distributed Intelligent Agents". IEEE Computers and Communications, 1992. Apr. 1–3, 1992. pp. 379–386.*
Jander, Mary. "Wan Protocol Analyzers." Data Communications, vol. 21, No. 6, pp. 69–82 (1992).
Prufer, Rona J. "Network advisor protocol analysis: decodes." Hewlett–Packard Journal, vol. 43, No. 5, pp. 34–40 (1992).
Bhat, Sunil. "The network advisor analysis and real–time environment." Hewlett–Packard Journal, vol. 43, No. 5, pp. 29–33 (1992).
Kafka, Gerhard. "Protokollanalysatoren." Elektronik, vol. 36, No. 4, pp. 111–117 (12987).

* cited by examiner

Primary Examiner—Melvin Marcelo
Assistant Examiner—Derrick W. Ferris
(74) Attorney, Agent, or Firm—Browdy and Neimark, P.L.L.C.

(57) ABSTRACT

An apparatus and a method for monitoring and interpretation of application protocols for network data transmission systems are provided, wherein the apparatus comprises: a data packets monitoring device (9); a control unit (15) receiving the data coming from the monitoring device (9) and discriminating them in control and information frames; a dating unit (16) connected to the control unit (15), for obtaining a reconstruction of a tree structure containing statistic information depending on the kind of communication for a certification of the communications and a monitoring of possible anomalies.

4 Claims, 7 Drawing Sheets

APPARATUS AND METHOD FOR MONITORING AND INTERPRETATION OF APPLICATION PROTOCOLS FOR NETWORK DATA TRANSMISSION SYSTEMS

The present invention provides an apparatus and a method for monitoring and interpretation of application protocols for network data transmission systems.

More particularly, the present invention allows a reconstruction of the application communications which occurred within the network portion taken into consideration. Therefore, it becomes possible to reconstruct a tree structure containing statistic information related for example to the data exchanges between a plurality of users of a certain service and the service itself. Such a tree structure containing statistic information allows a certification of the data and of the communication correctness at various layers comprising the application one, as well as the monitoring of possible anomalies and the construction of diagnostical statistics.

Data transmission from a source device to a destination device can occur in different manners. However, to assure a data exchange having the lowest possible chance of errors, it is necessary to adopt a series of rules or control procedures. Said rules or procedures are known as "communication protocols".

A well known communication protocol is the "Open System Interconnection" (OSI) of the International Standards Organization (ISO). Said protocol is divided into seven layers, shown in FIG. 1. Layer 7 (application) on the source side contains information related to the sole message (M) to be sent to the destination side. The successive layers on the source side add control information to the message:. layer 6 (presentation) divides the data of the original message into blocks (M1 and M2); layer 5 (session) adds a title (S) to indicate the sender, the receiver and some information related to the sequence; layer 4 (transport) adds information (T) related to the logic connection between the sender and the receiver; layer 3 (network) adds information related to the path (N) and divides the message into packets representing the standard communication unit in a network; layer 2 (data link) adds a title portion (B) and a tail portion (E) to the message to assure the correct order of the various packets and to correct transmission errors; the single message bits and control information bits added by the various layers are transmitted on the physical medium through layer 1. The downward pointing arrow F1 on the sender side indicates the manner according to which the outgoing message is constructed. Every addition to the message is verified and removed from the corresponding layer on the destination side. The upward pointing arrow F2 on the destination side indicates the manner according to which the incoming message is reconstructed.

The OSI model schematically described up to this point is just a conceptual model. A typical protocol normally adopted is for example the TCP/IP (Transmission Control Protocol/Internet Protocol). Said protocol, just like other communication protocols adopted, can be explained with reference to the layers structure of the OSI model. In fact, in each of said protocols, a certain source layer will divide the data it receives from an upper layer adding to said data a header and/or a tail and will forward all this to a lower layer. On the destination side the opposite operations will occur.

Therefore, during the present description, reference will be made to the conceptual OSI model for ease of reference; it is to be understood that what it will be described, will be easily suitable for every application protocol with obvious modifications, typical of the relation existing-between each-application protocol and the OSI standard.

Monitoring systems for data transmitted between a sender node and a destination node are already known. However, said systems can only analyze the OSI layers 2 (data link) and 3 (network). The monitoring and the successive interpretation of the data at said layers allow only the monitoring of anomalies in the exchange protocol among the various components of a network data transmission system.

In particular, documents "The Network Advisor Analysis and Real-Time Environment" and "Network Advisor Protocol Analysis: Decodes" by Sunil Bhat, Hewlett-Packard Journal, vol. 43 no. 5, Oct. 1, 1992, pages 29–33 and 34–40 respectively, are known. Such documents refer to analysis of the network status, between a source node and a destination node and are directed towards error and/or malfunction monitoring at a protocol level (IP, UDP etc) used by various applications.

Therefore, a typical disadvantage of said prior art systems is their incapability of decoding the application piece of information transported on the network, i.e. the piece of information related to the layers 4 to 7 of the OSI standard.

The present invention overcomes said prior art problem. A first object of the present invention is to allow the reconstruction of the information exchange between the source and the destination node as far as data and time are concerned. The time reconstruction will be allowed by a dating unit. The data reconstruction will be allowed by the comparison with predetermined data representing possible interpretations of the information exchange.

A second object of the present invention is to provide a safe and reliable certification tool of the application sequences on public communication networks, once said sequences are reconstructed.

Another object of the present invention is to monitor and record the possible presence of errors in the applications operating in the communication network wherein the data were monitored and interpreted.

A further object of the present invention is to allow a record for administrative, accounting and safety purposes of the monitored and interpreted data exchange.

The present invention provides an apparatus for monitoring and interpretation of application protocols for network data transmission systems comprising:

a data packets monitoring device at a layer corresponding to the OSI layer 2, said data packets comprising control frames and information frames, wherein the control and information frames contain a header portion and a body portion, said header portion allowing the distinction between an information frame and a control frame;

a control unit receiving as an input the data coming from the monitoring device and comprising means for the discrimination of the control frames from the information frames;

a dating unit connected to the control unit and associating a monitoring time to the control frames and to the information frames;

a discriminated data storing unit, storing the control and the information frames and the monitoring time thereof, bidirectionally connected to the control unit; and a predetermined data storing unit, bidirectionally connected to the control unit, said predetermined data representing possible interpretations of the information or control frames contained in the discriminated data storing unit and being comparable, by the control unit, with the data contained in the body portion of the information or control frames stored in the discriminated data storing unit, as to allow:

an ordering, according to the time and to the kind of communication, of the body portions of the control and information frames; and a reconstruction of tree structures containing statistic information according to the kind of communication (multiprotocol reconstruction), for a certification of the communications and a monitoring of possible anomalies.

Furthermore, a method for monitoring and interpretation of application protocols for network data transmission systems is provided, comprising the following steps:

monitoring data packets at a layer corresponding to the OSI layer 2, said data packets comprising control frames and information frames, wherein the control and information frames contain a header portion and a body portion, said header portion allowing the distinction between an information frame and a control frame;

discriminating the control frames from the information frames;

associating a monitoring time to the control frames and information frames;

storing the discriminated control frames and information frames together with their monitoring time; and storing predetermined data representing possible interpretations of information or control frames, said predetermined data being comparable with the data contained in the body portion of the stored discriminated information or control frames;

ordering the body portions of the control or information frames according to the time and to the kind of communication; and reconstructing tree structures containing statistic information according to the kind of communication (multiprotocol reconstruction), for a certification of communications and a monitoring of possible anomalies.

Additional features of the present invention are provided in the dependent claims.

Therefore, the apparatus and the method according to the present invention can analyze every layer of the ISO/OSI standard up to the application one as well as similar layers for other standards. In this manner, the reconstruction of the information exchanges occurred in a certain time interval between applications operating in remote processors is made possible.

The apparatus and the method according to the present invention operate in a "transparent" manner, as data transmission between source and destination is not influenced by the monitoring and the successive interpretation of the same data.

The apparatus and the method according to the present invention can also operate on wireless telecommunication networks.

The present invention will be illustrated herebelow by referring to a preferred embodiment thereof, explained by way of a non-limiting example.

The annexed drawings will be referred to, wherein:

FIG. 1, as set forth above, shows a schematic diagram of the OSI standard;

With reference to the OSI standard, the communication unit in a network is the packet. Packets are in turn divided into frames. The beginning and the end of each frame are usually determined by delimitation characters. The frames are in turn divided into information and control frames. The information frames transport the data relative to the message that is to be transmitted throughout the network, while the control frames deal with the regulating modes of said transport, i.e. the flow control and the starting of the error recovery actions. Both the information and the control frames contain a header portion identifying the frame type, and a body portion which is typical of the frame itself.

Figure 1:
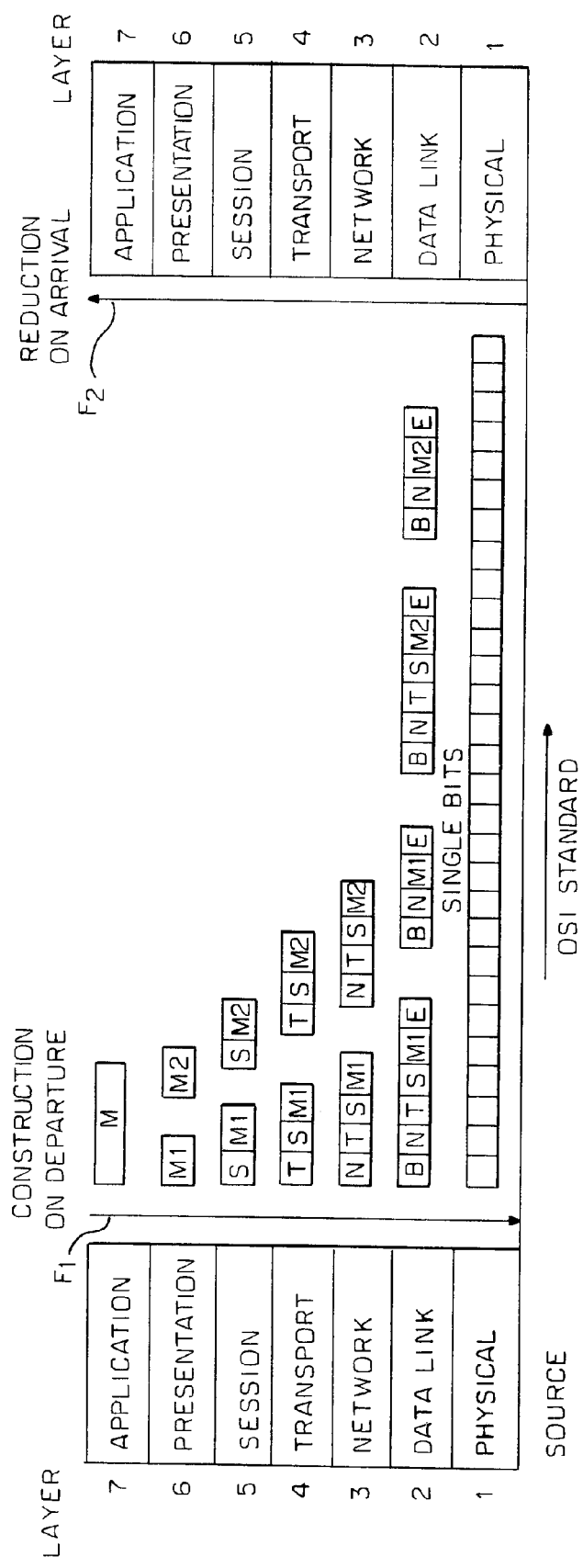
Figure 2:
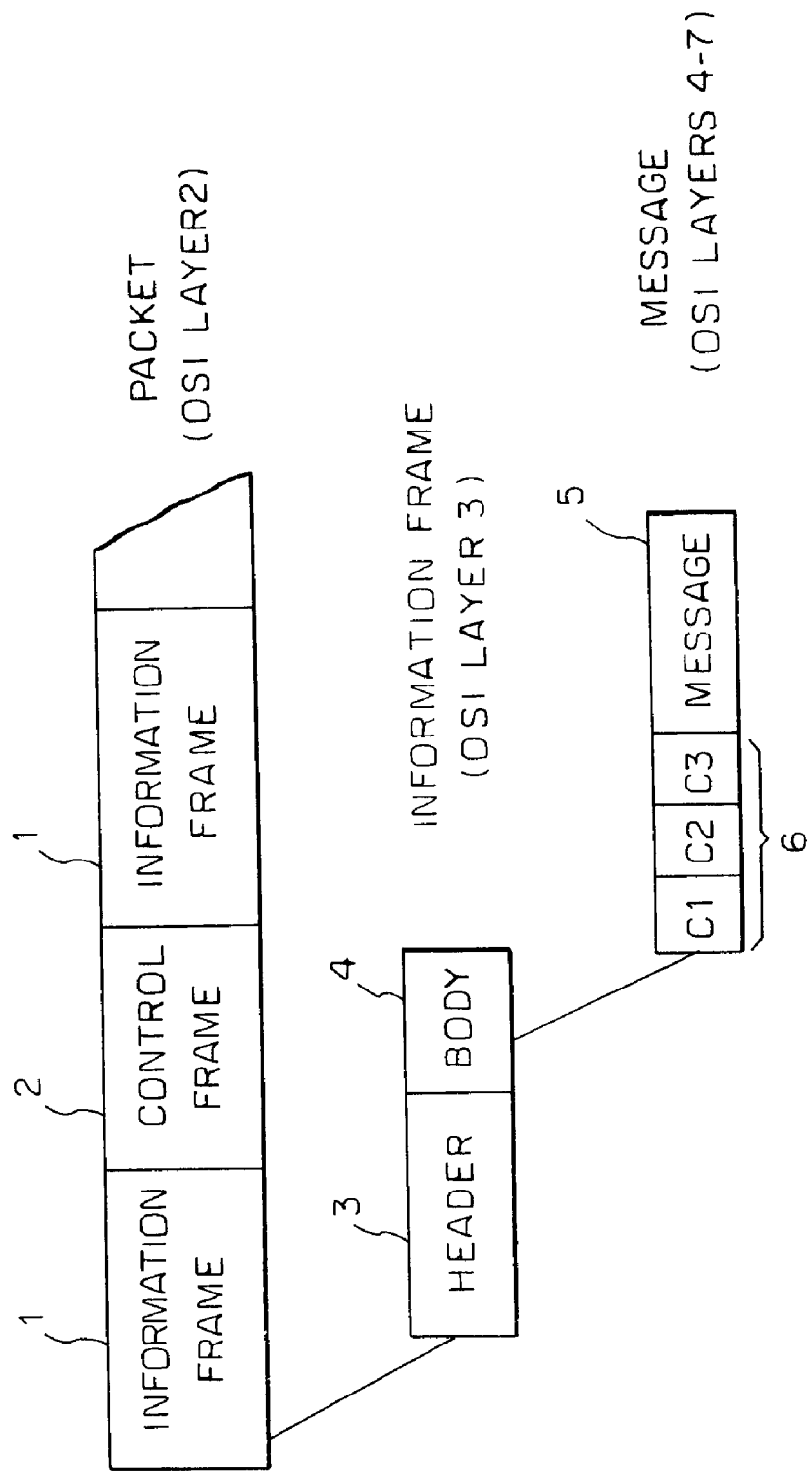
FIG. 2 shows a schematic view of the kind of data used on communication networks.

The information frame structure will be described with reference to FIG. 2. Tn the upper portion of said figure, the generic structure of a OSI layer 2 packet is schematically described, thus comprising both information frames 1 and control frames 2. A single information frame (OSI layer 3) is constituted by a header portion 3, containing the identification that the frame is an information frame, and by a body portion 4. The body portion (OSI layers 4 to 7) contains the real message 5, together with a plurality of fields 6, typical of the particular application syntax used, illustrated by way of example in the figure with the characters C1, C2 and C3. The application syntax is the information relative to the number of fields contained within the plurality 6, to the meaning of each of said fields and to the data contained therein.

Figure 3:
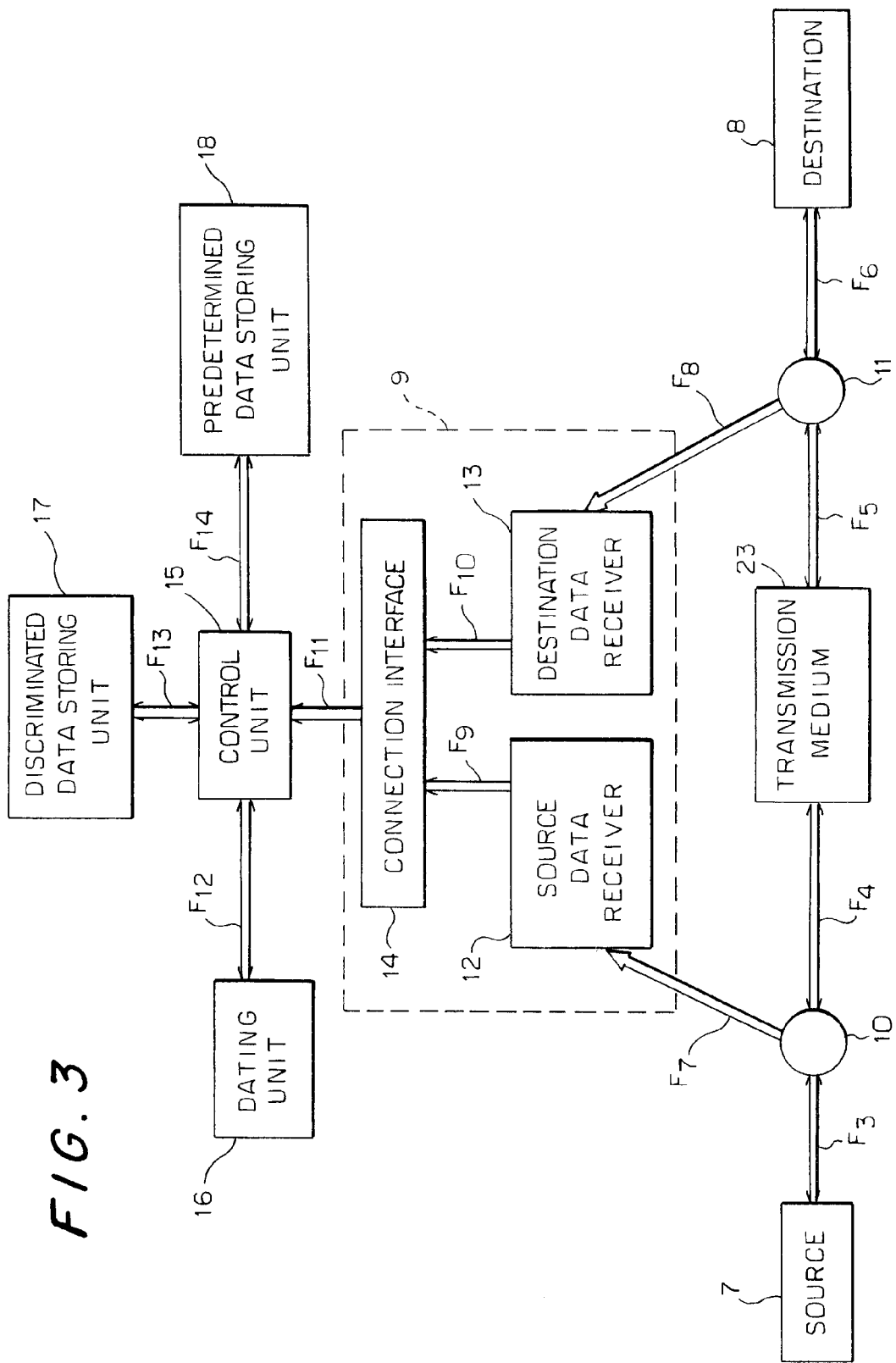
FIG. 3 shows a block diagram of the apparatus according to the present invention.

Reference will be now made to FIG. 3. A source node 7 and a destination node 8 are shown, terminals of the network portion in which the data are monitored and interpreted. Throughout the connection between said two nodes, schematically illustrated by arrows F3, F4, F5, F6 and by the transmission medium 23, data relative to plural communications between a first set of source processors (not shown in the figure) upstream of the source node 7 and a second set of destination processors (not shown in the figure) downstream of the destination node 8 travel bidirectionally.

The present invention provides monitoring of said data by means of a data monitoring device 9. Several are the monitoring devices known on the market, for example the S508 card produced by the Canadian company Sangoma. Such card can operate with different OSI layer 1 (physical layer) standards such as, for example, the RS232 (or V.24) standard and the RS422 (or V.35) standard. The OSI layer 2 and 3 standards together with said card can operate are, for example, the HDLC standard and the X.25 standard. Anyway, the kinds of data monitoring device 9 to be chosen for the purposes of the present invention can vary depending on which OSI layers 1 or 2 standards one needs to operate. In fact, it will be possible to use monitoring devices working with implementation standards different from the OSI layer 2, such as for example "Frame Relay" or SDLC or also BSC and the like. Said devices are well known to the person skilled in the art and they will not be here described in detail.

The monitoring occurs "transparently" by means of two parallel connectors 10 and 11, schematically illustrated in the figure, allowing the monitoring of the data coming respectively from the source node 7, and from the destination node 8 without influencing their transmission from the source node to the destination node and viceversa. The monitoring device 9, shown by the dashed block in the figure, includes a source data receiver 12, a destination data receiver 13 and a connection interface 14. The source data receiver 12 allows reception of the data coming from the source node 7 only, as it is schematically indicated with the arrow F7; on the other hand, the destination data receiver 13 allows the reception of the data coming from the destination node 8 only, as schematically indicated with the arrow F8. At OSI layer 2, data coming from the source node contain a code identifying the source, while data coming from the destination node contain a code identifying the destination. The source data receiver 12 and the destination data receiver 13 can therefore easily identify the two different types of data. The data received in this manner are transmitted to the connection interface 14, as it is indicated by arrows F9 and F10.

Each data packet situated at a layer corresponding to the OSI layer 2 read by the monitoring unit 9 is forwarded to a control unit 15, as indicated by arrow F11. The operation of the control unit 15 will be described in detail later. To each of said packets a reading time is associated by means of a dating unit 16, represented outside the control unit 15 for ease of description and therewith connected as indicated by arrow F12. Such dating unit 16 can be any device commonly available, in particular a radio or a satellite one. In a preferred embodiment of the present invention, a radio controlled digital clock adjusted on the CET (Central European Time) broadcast by a geostationary satellite was used.

Further to the association of the reading time by means of the dating unit 16, the control unit 15 discriminates the information frames from the control frames. For example, if transmission of the information occurs in the HDLC language, the last bit of the header portion of the information frame is 0 whereas the last bit of the header portion of a control frame is 1. Therefore, inside the control unit 15 there are means, not described in the figure, discriminating said last bit, e.g. a firmware contained in a ROM. In any case, no matter which data transmission code is used, it will always be possible to provide means for said discrimination discriminating a control frame from an information frame. Such discrimination thus allows the storage of the single information frame deprived of the header portion and comprising the body portion only, thus containing the information which is typical of the particular application syntax used, together with the message to be transmitted.

The data incorporating the monitoring time and divided into information frames and control frames are stored inside a discriminated data storing unit 17, bidirectionally connected to the control unit 15 as indicated by arrow F13. There is also a predetermined data storing unit 18, bidirectionally connected to the control unit 15. Said predetermined data represent possible interpretations of the information or control frames contained in the discriminated data storing unit 17. Their use will be explained herebelow with reference to the following figures. The connection between the predetermined data storing unit 18 and the control unit 15 is indicated by arrow F14.

Figure 4:
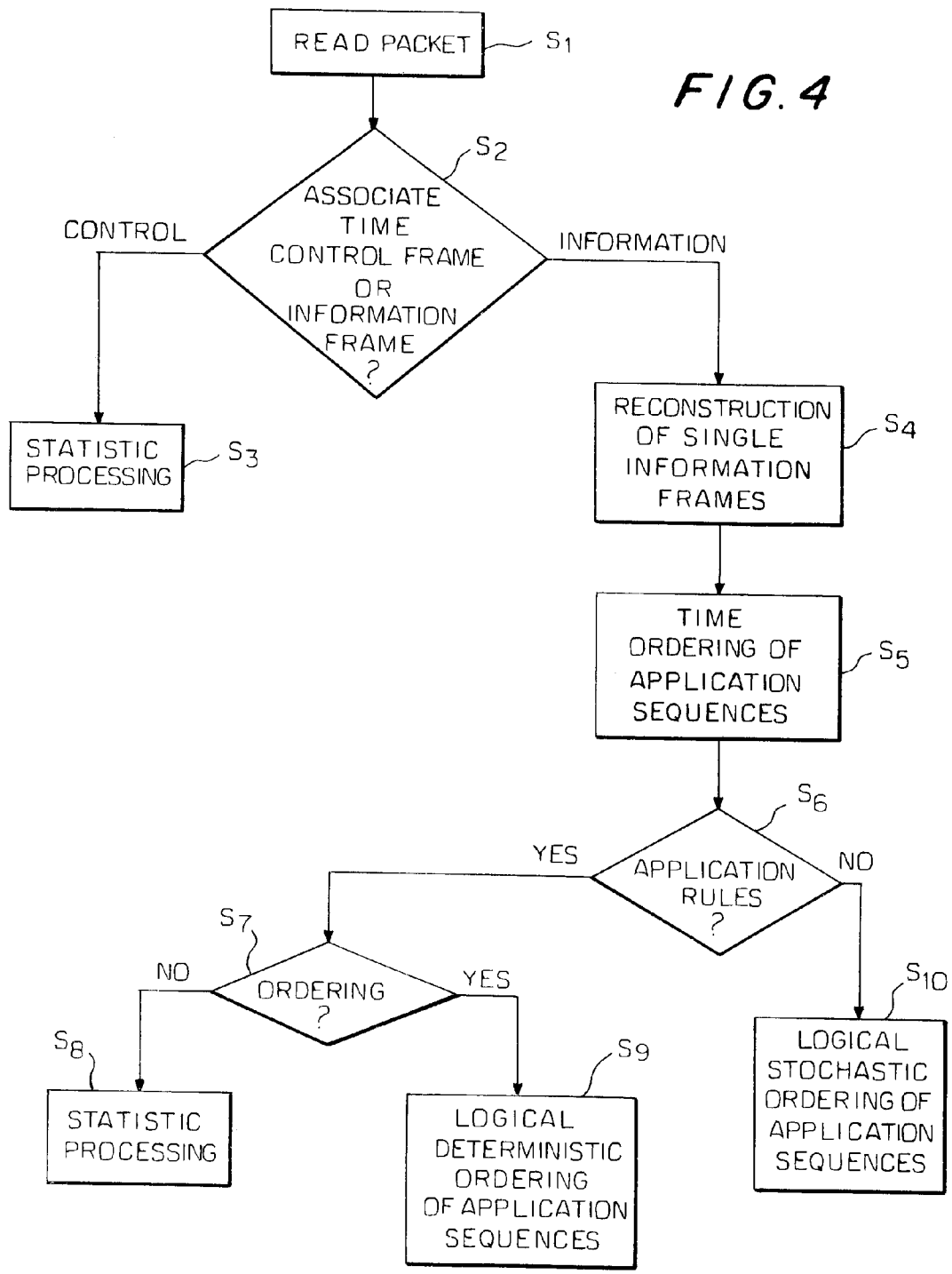
FIG. 4 shows a flow chart explaining the operation of the apparatus and method according to the present invention.

Reference will be now made to FIG. 4, showing a flow chart indicating the operations executed by the control unit 15 on the information frames stored in the discriminated data storing unit 17. It is to be understood that the access to such information frames can be selectively regulated by authorizations and privileges management systems such as passwords, encryption and decryption codes, badge readers and the like given to qualified users.

A first step S1 indicates the reading of the various packets by the monitoring unit 3. A second step S2 indicates the previously described discrimination operated by the control unit 15 between the information frames and the control frames, together with the association of the monitoring time.

On the non-application low layer control frames, a statistic processing might also be provided operated in the step S3. Said processing is not described in detail at the moment; the modes by which it occurs will turn out to be clear at the end of the present description. The final result of such processing will provide a list of the control frames, reporting also the number of occurrences for each of said frames.

As for the information frames, the flow proceeds to a step S4 wherein the single information frames are reconstructed according to the their specific application syntax. To the purposes of said reconstruction, the application syntax structures of the single information frames must be known. In fact, they are contained inside the predetermined data storing unit 18 described with reference to the previous FIG. 3. Said unit 18 contains, for example in a text file, a formal abstract description for possible interpretations of the information or control frames. Said data represent the modes according to which the body portion of a single information frame can be structured, for example the machine transmission code (i.e. related to an information frame forwarded by the source or the destination), the number of the channel (i.e. related to a specific processor upstream of the source node or to a specific processor downstream of the destination node), protocol numbers, data processing numbers etc. Said unit 18 can of course contain the syntax of several application protocols of the information frames that are to be reconstructed in that moment.

A reconstruction of the information frames one by one is obtained by a sequential comparison of the body portion of each information frame with each one of the abstract models in the unit 18.

Further to this, the different application sequences occurred between a determined source processor and a determined destination processor can be reconstructed, i.e. ordered according to time and kind of communication. Throughout the present description, for application sequence will be intended the whole of the information frames exchanged between a determined source processor and a determined destination processor during a single communication. The application sequence ordered in step S5 will contain the single information frames ordered according to a time criterion only and not also to a logic one. Ordering by time will be possible through the time association occurred in the previous step S2. To give also a logical ordering of the data inside a specific application sequence, the presence of a group of application rules directing the data exchange between source and destination can be useful, although not necessary. Said application rules, typical of the particular kind of conversation between a determined source processor and a determined destination processor, must be predetermined and as such, they as well are collected in the predetermined data storing unit 18. Said application rules are a series of possible interpretations of the information frames sequences contained in the discriminated data storing unit 17.

An example of such application rules is given by Table 1 herebelow, wherein reference is made to a communication between a source representing a student (client) wanting to enroll to university via terminal, and a destination (server) representing the university where the student wants to enroll.

TABLE 1

1: AS ? FDB 15 AS ? FDB 5 AS ? FDB 0
The enrollment booking was regularly acquired
2: AS ? FDB 13 AS ? FDB 0
The client position is not regular
.........
.........
.........

Every line of said table is an application rule, indicating i.e. a possible data exchange application sequence between source and destination. The meaning of each application sequence is illustrated herebelow. For example, the first line indicates the following sequence of information frames:

the source (AS) interrogates (?) the destination;

the destination (FDB) answers with the activity number 15;

the source (AS) interrogates again (?) the destination;

the destination (FDB) answers with the activity number 5;

the source (AS) interrogates (?) the destination; and the destination (FDB) answers with the activity number 0.

The result obtained at the end of this conversation is that the booking for the university enrollment is regularly acquired. The structure of Table 1 is a mere example and it could also be illustrated with a tree structure having a number of branches depending on the number of application sequences provided. Every path down to one of the tree leaves would illustrate a particular application sequence, i.e. a particular conversation between source and destination, i.e. a particular information frame sequence between source and destination.

The number of application rules can be anyone. The larger the number of application rules provided, the bigger the chance to associate each of the application sequences temporally reconstructed in the step S5 with a well defined logic meaning found by comparison with a particular application rule contained in the storing unit 18 in FIG. 3. Therefore, in this manner it will be possible to verify the correctness or the anomaly of the particular application sequence that is being compared in that moment.

In the step S6 in FIG. 4, the control unit 15 verifies first of all whether such application rules are available or not. Supposing that said application rules are known, the flow can proceed either toward a step S8 or toward a step S9, depending on what was chosen in the step S7. The step S8 allows a simple classification of the application sequences. In fact, each application sequence is classified as belonging to a particular path among the various possible paths inside the application rules tree. The step S8 will be explained in greater detail with reference to the following FIG. 5.

On the other hand, in the step S9 the logical path of all the application sequences monitored by the apparatus in a predetermined time interval is reconstructed. Said step S9 will be described in greater detail with reference to the following FIG. 6.

The apparatus according to the present invention allows a reconstruction of the logical path of the application sequences also if a series of application rules is not provided. In this event, the flow proceeds toward a step S10, that will also be described later.

Figure 5:
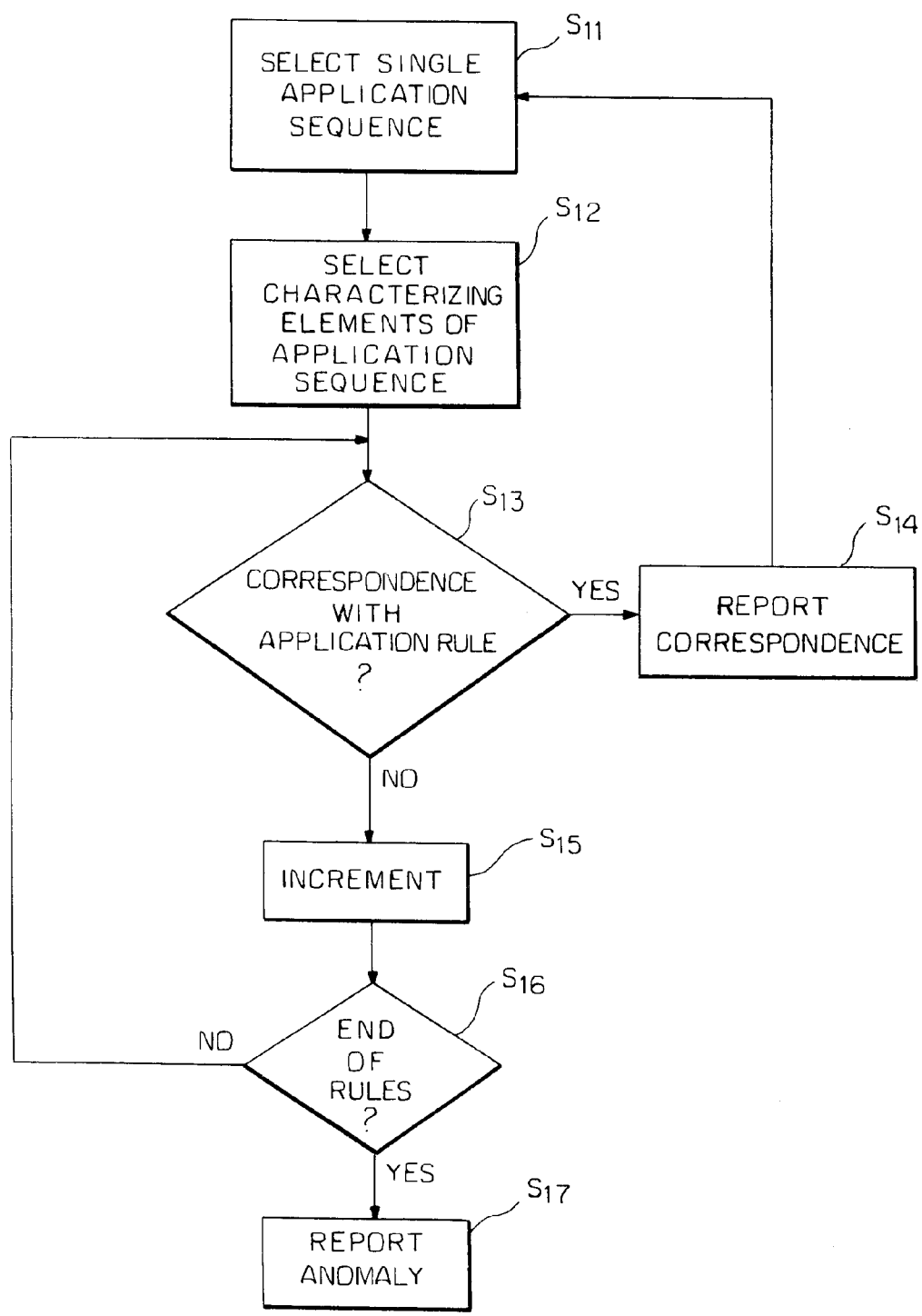
FIGS. 5 and 6 show additional flow charts for the understanding of what described with reference to FIG. 4.

Reference will be now made to FIG. 5, which provides a more detailed explanation of what previously described with reference to the step S8 in FIG. 4.

In a first step S11 the single application sequence, object of the comparison, is selected. In a successive step S12, the elements which are characterizing for comparison purposes are selected inside the selected application sequence. In the example of the enrollment to university previously described in table 1, said characterizing elements might be: the identification number of the source processor, the identification number of the user who required the enrollment operation, the data provided by the source and the data provided by the destination. In the step S13 the characterizing elements of the considered application sequence are compared with one of the application rules of the above described table 1, searching for a possible correspondence. If such a correspondence is found, the flow proceeds toward a step S14 wherein said correspondence is reported and will have to be taken into consideration in the results of the interpretation. Then the flow selects another sequence and executes again the step S11. If the correspondence at the step 13 is not found, the control unit 15 goes in step S15 to a subsequent rule and if (step S16) there are still rules allowing a comparison, the control unit executes once again the comparison of step S13. If no further rules are found, the control unit reports an anomaly in the step S17. Such an anomaly might alternatively mean:

either a kind of sequence which should have not been occurred (a real anomaly); or a kind of sequence not inserted by mistake inside the application rules tree.

In each of said events, finding such an anomaly is certainly useful for the certification of the kinds of application sequences occurred in the network portion under examination.

Figure 6:
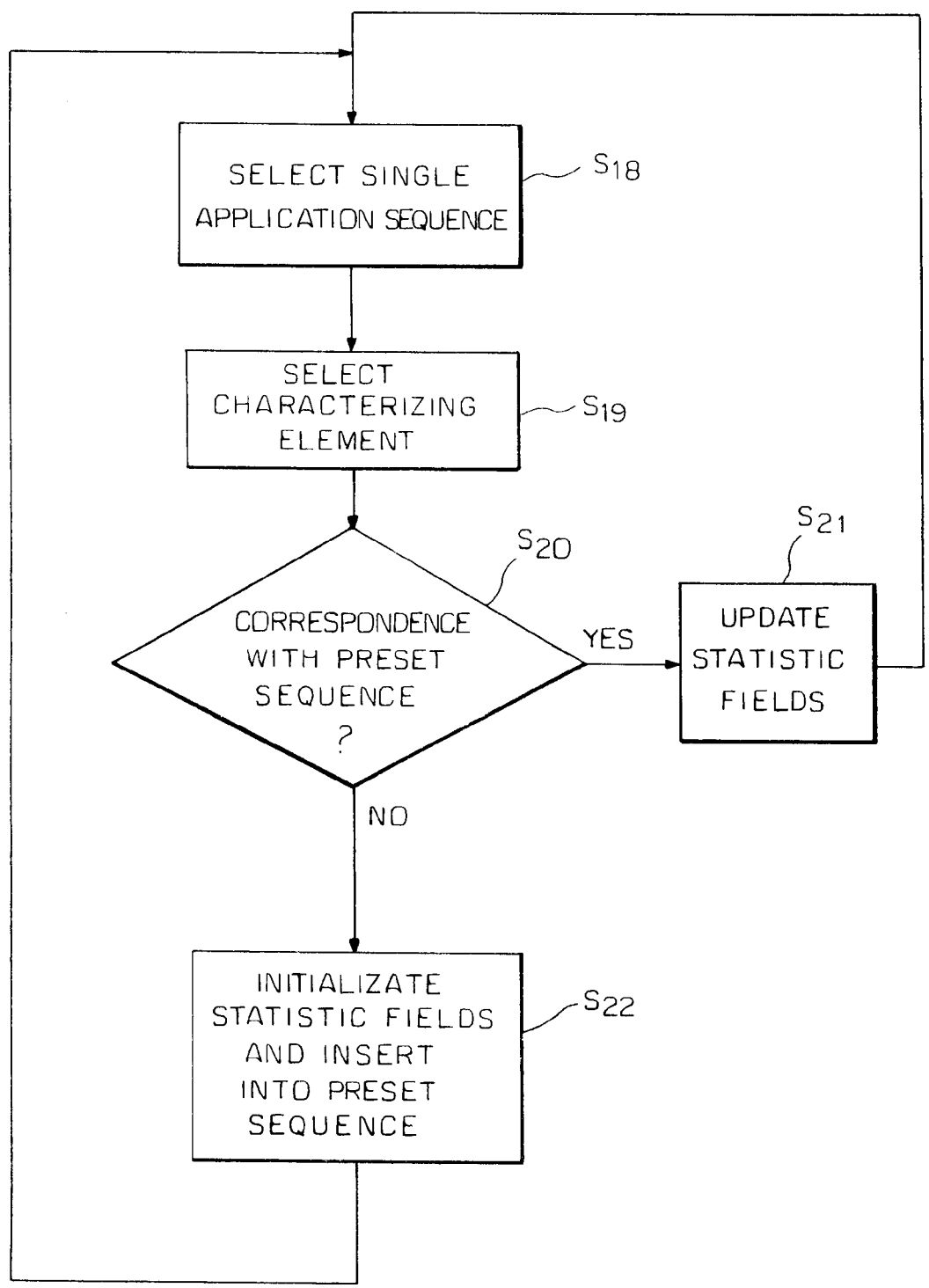

Reference will be now made to the following FIG. 6 which gives a more detailed explanation of what described in the step S9 in FIG. 4.

The steps S18 and S19 select respectively the single application sequence and the characterizing elements of the same, similarly to what described with reference to the previous FIG. 5. The step S20 is to indicate the comparison between the application sequence and the preset application rules contained inside the predetermined data storing unit 18. If a correspondence is found, the flow proceeds toward a step S21 wherein the correspondence found is taken into consideration through the update of the related statistic fields. Steps S18–S20 will be subsequently repeated until the end of the sequences to be classified. If no correspondence is found, the application sequence to be classified is new; it can be an anomaly or simply an unexpected sequence. In this event, the flow proceeds toward a step S22 wherein the statistic fields related to that specific sequence are initialized. Furthermore, the new sequence will be inserted in the list of the preset sequences that are to be used for the comparison in the step S20. This is also indicated by the double pointing of the arrow F14 in the previous FIG. 3. Said particular sequences, i.e. the possible anomalies, can be evidenced in a particular manner to be recognized as such. Further to this, also in this case the steps S18–S20 are repeated until the end of the sequences to be classified. In particular, besides the number of crossings for each tree branch, it is also possible to monitor uncrossed branches.

In case there is no preset sequence of application rules, it will always be possible for the control unit to reconstruct the communication applications occurred in the network portion under control (step S10 in FIG. 4). In this event, each analyzed application sequence will not be compared with the preset sequences, but with the previously analyzed sequences, acting as predetermined data to be compared with the sequences to be further analyzed. Therefore, the tree structure containing statistic information will be reconstructed by reciprocal comparison of each body portion of the information frames with the others. Also in this case, a tree will be constructed and it will be possible to know the number of crossings for each branch. Obviously, in this case it will not be possible to monitor the uncrossed branches as there will not be a prior knowledge of the existence of said branches.

Figures 7A, 7B:
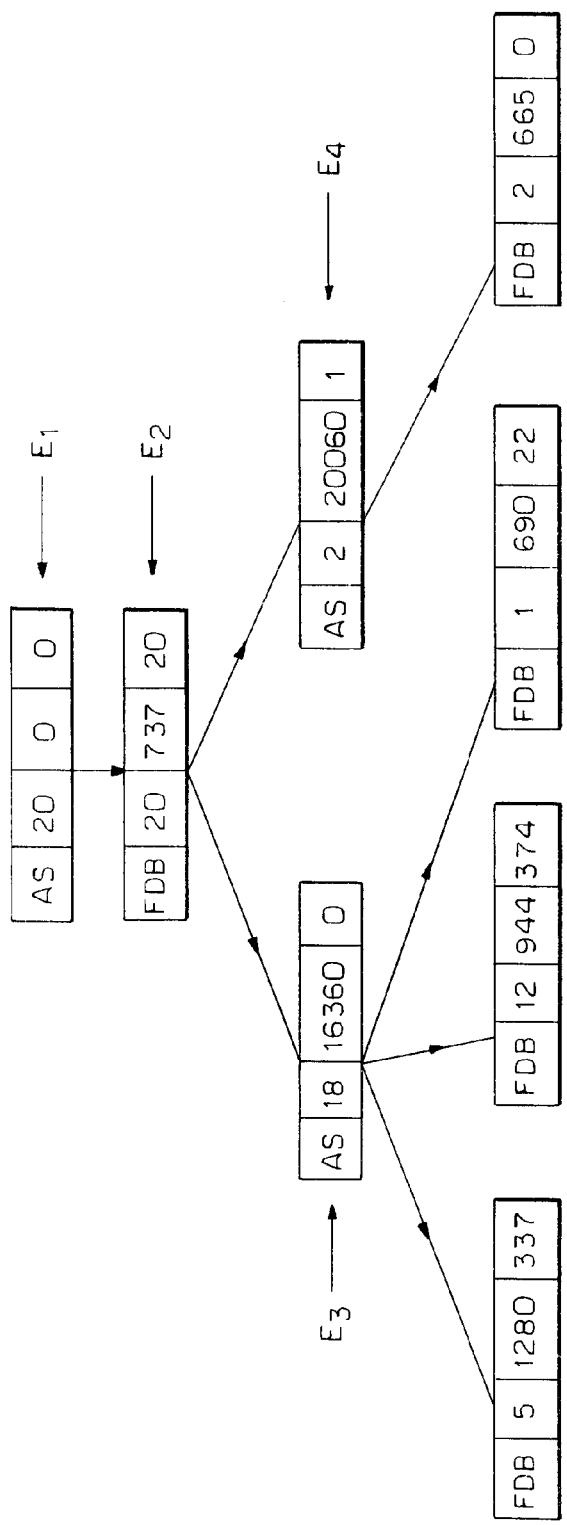
FIGS. 7A and 7B show an example of a tree structure containing statistic information obtained by means of the apparatus and method according to the present invention.

Finally, reference will be made to FIGS. 7A and 7B showing respectively an example of an information frame structure and an example of a tree structure containing statistic information obtained by means of the apparatus according to the present invention.

In FIG. 7A it is possible to notice four different fields: a first field 19 indicating the name of the source or destination processor; a second field 20 indicating the number of connections in the monitored time interval, a third field 21 indicating the average time length of each connection, counted for example in milliseconds, and a fourth field 22 indicating the code of the activity executed.

FIG. 7B indicates the reconstructed tree. A first element E1 in the tree indicates that AS (source) connected 20 times, with an average connection time of 0 milliseconds (simple opening of the connection with the destination) and executed the activity with the code 0. A second element E2, E1's only "son", indicates that in all those 20 connections FDB (destination) answered with the activity having the code 20, with an average connection time of 737 milliseconds. There were two manners of proceeding. AS answered 18 times (element E3) with the activity 0 and twice (element E4) with the activity 1. The tree proceeds with other elements whose meaning is now clarified by the context. The tree herewith disclosed is the result of the logical ordering operated in the steps S9 or S10 in FIG. 4.

It is to be noted that the monitoring of the contents in the fields 19 and 22 of each element was operated in the step S4 in FIG. 4. The monitoring of the connections among the various elements, i.e. the fact that the element E2 is E1's "son" and that the elements E3 and E4 are E2's "sons", was operated either in the step S9 or in the step S10 in FIG. 4.

The present invention has been up to now described with reference to some of its forms of preferred embodiment, given as non-limiting examples. For example, it is to be understood that it is possible to provide an application according to the present invention having several apparatuses provided along different portions of the line.

Furthermore, it is to be understood that there are other possible embodiments and kind of services falling within the protective scope of the present application.

What is claimed is:

1. An apparatus for monitoring and interpretation of application protocols for network data transmission systems comprising:

a data packets monitoring device (9) at a layer corresponding to the OSI layer 2, said data packets comprising control frames and information frames, wherein the control and information frames contain a header portion and a body portion, said header portion allowing the distinction between an information frame and a control frame;

a control unit (15) receiving as an input the data coming from the monitoring device (9) and comprising means for the discrimination of the control frames from the information frames;

a dating unit (16) connected to the control unit (15) and associating a monitoring time to the control frames and to the information frames; and a discriminated data storing unit (17), storing the control and the information frames and the monitoring time thereof, bidirectionally connected to the control unit (15), characterised in that it further comprises:

a) a predetermined data storing unit (18), bidirectionally connected to the control unit (15), said predetermined data representing possible interpretations of the information frames contained in the discriminated data storing unit (17);

b) means for comparing, by the control unit (15), said predetermined data stored in the storing unit (18) with the data contained in the body portion of the information frames stored in the discriminated data storing unit (17), thus reconstructing the information frames according to their specific application syntax;

c) means for ordering, according to the time and kind of communication, the information frames reconstructed according to their specific application syntax, thus reconstructing application sequences occurred between a determined source processor and a determined destination processor; and d) means for ordering said information frames ordered according to the time and kind of communication also according to a logical criterion, thus reconstructing the logical path of said application sequences occurred between a determined source processor and a determined destination processor.

2. The apparatus according to claim 1, characterized in that said means for ordering said information frames according to a logical criterion comprise means for reciprocally comparing the body portion of the information frames.

3. The apparatus according to claim 1, characterized in that said means for ordering said information frames according to a logical criterion comprise means for comparing each sequence of body portions of the information frames with a set of predetermined sequences, said predetermined sequences representing possible interpretations of the information frames sequences contained in the discriminated data storing unit (17), said predetermined sequences being contained in said predetermined data storing unit (18).

4. A method for monitoring and interpretation of application protocols for network data transmission systems comprising the steps of:

monitoring data packets at a layer corresponding to the OSI layer 2, said data packets comprising control frames and information frames, wherein the control and information frames contain a header portion and a body portion, said header portion allowing the distinction between an information frame and a control frame;

discriminating the control frames from the information frames;

associating a monitoring time to the control frames and information frames; and storing the discriminated control frames and information frames together with their monitoring time, characterized in that it further comprises the steps of:

a) storing predetermined data representing possible interpretations of the information frames;

b) comparing said predetermined data with the data contained in the body portion of the stored information frames, thus reconstructing the information frames according to their specific application syntax;

c) ordering, according to the time and kind of communication, the information frames reconstructed according to their specific application syntax, thus reconstructing application sequences occurred between a determined source processor and a determined destination processor; and d) ordering said information frames ordered according to the time and kind of communication also according to a logical criterion by reciprocally comparing the body portion of the information frames, thus reconstructing the logical path of said application sequences occurred between a determined source processor and a determined destination processor.

* * * * *